United States Patent [19]
Davis

[11] 4,049,100
[45] Sept. 20, 1977

[54] TORQUE CONTROL DEVICES OF THE VISCOUS SHEAR TYPE AND COMPONENTS THEREFOR

[75] Inventor: William P. Davis, Exton, Pa.
[73] Assignee: L G Industries, Incorporated, Coatesville, Pa.
[21] Appl. No.: 640,454
[22] Filed: Dec. 15, 1975
[51] Int. Cl.² ............................................. F16D 13/72
[52] U.S. Cl. ............................ 192/58 C; 192/85 CA; 192/113 B; 192/112
[58] Field of Search ................. 192/58 A, 58 B, 58 C, 192/113 B

[56] References Cited
U.S. PATENT DOCUMENTS

| 2,150,950 | 3/1939 | Thoma | 192/113 B |
| 3,011,607 | 12/1961 | Englander | 192/58 C |
| 3,071,225 | 1/1963 | Blau et al. | 192/58 C |
| 3,534,842 | 10/1970 | Davidson | 192/113 B |

FOREIGN PATENT DOCUMENTS

| 264,826 | 2/1950 | Switzerland | 192/58 B |

Primary Examiner—Benjamin W. Wyche
Attorney, Agent, or Firm—Robert C. Podwil

[57] ABSTRACT

The pressure plate of a torque control device of the viscous shear type includes a plurality of circumferentially spaced fluid transfer ports extending between faces of the plates, the ports comprising blind slot portions opening on one face of the plate and indented portions in the other face of the plate in fluid communication with the blind slot portions. A method is disclosed for making such slots.

11 Claims, 7 Drawing Figures

TORQUE CONTROL DEVICES OF THE VISCOUS SHEAR TYPE AND COMPONENTS THEREFOR

This invention relates to torque control devices of the viscous shear type and components for such devices, and to a method of making such components. More particularly, this invention relates to torque control devices which are intended to operate in controlled slip as their normal mode of operation, and to pressure plates for such devices and methods of making them.

The term "slip clutch" is used in the art to describe devices which, in contrast to the more familiar types of devices which in normal operation are either wholly engaged or wholly disengaged, operate with a desired difference in angular velocity, i.e. "slip", between their input and output components. One known class of such devices utilizes the physical properties of a thin film of viscous fluid, such as oil, to transmit torque from an input to an output member. The present invention relates to devices of this general class which are adapted to the particular task of providing a substantially constant torque differential between input and output components regardless of the condition of slip within a given range.

The term "clutch" will be understood by those in the art to mean a device which both input and output members are normally in motion. "Brake" will be understood to mean, as it does in the art, a device in which the member corresponding to the output member of a clutch is normally fixed. The principles of this invention are equally applicable to both clutches and brakes, and both are referred to hereinafter generically as "torque control devices".

It is a primary object of this invention to provide a torque control device which provides for slippage between input and output components as a normal condition of operation, and is capable of providing a relatively uniform predetermined value of torque throughout a wide range of input speeds and conditions of slip.

It is another object of this invention to provide such a device which is mechanically simple and reliable, and also relatively easy to manufacture. Other objects will appear hereinafter.

U.S. Pat. Nos. 2,576,156 and 2,684,743, issued Nov. 27, 1951 and July 27, 1954, respectively, to L. A. Trofimov, and U.S. Pat. No. 3,071,225, issued Jan. 1, 1963, to R. E. Blau, illustrate and describe examples of prior art torque control devices which make use of oil films for the purpose of torque transmission. In U.S. Pat. Nos. 2,576,156 and 2,684,743, disk clutches using multiple slotted or grooved disks, provide a torque characteristic which is described (in U.S. Pat. No. 2,684,743) as directly proportional to the slip between input and output components. In U.S. Pat. No. 3,071,225, there is disclosed an apparatus which is said to provide a relatively small amount of slip at rated torque and a relatively uniform output torque somewhat higher than rated torque at higher values of slip. The device includes one or more clutch disks provided with axially directed openings and slots extending radially from the openings to the other peripheries of the disks.

U.S. Pat. No. 2,150,950, issued Mar. 21, 1939, to H. Thoma and U.S. Pat. No. 3,534,842, issued Oct. 20, 1970, to E. D. Davison, Jr., illustrate examples of power transmission devices which appear not to be intended to operate in slip in their normal condition, but which provide a decaying fluid film during initial engagement and start up. In the device disclosed in U.S. Pat. No. 2,150,950, bevel-edged slots, somewhat like those disclosed in the above-mentioned Trofimov and Blau patents, are said to set up a cushion between clutch plates before they are forced into direct contact. In accordance with U.S. Pat. No. 3,534,842, recesses are provided in drive plates in communication with radially extending bleed openings or grooves, and fluid entrapped in the recesses provide a temporary lubricant film during engagement.

Numerous other prior art devices are known wherein fluid is caused to be distributed to the faces of drive members in a torque control device. Among these are U.S. Pat. Nos. 1,810,361; 2,690,248; 3,002,595; 3,011,607; 3,025,686; 3,101,825; 3,213,988; 3,433,339; 3,498,431; 3,575,269 and 3,791,498.

The present invention is directed, therefore, to torque control devices having input and output components drivingly inter-engaged by one or more pressure plates of a unique configuration which provides for establishment and maintenance of stable films of viscous fluid between the pressure plates and other drive members. The films thus established and maintained in the devices disclosed herein have been found capable of transmitting relatively uniform torque throughout a wide range of slip conditions. In the presently preferred forms of the invention, which will be described in detail below, pressure plates for torque control devices are provided with fluid transfer ports, which comprise blind slot portions opening on the rear face of the pressure plates, and indentations in the opposite face of the pressure plate, and extending into communication with the blind slot portions. It has been found that fluid entrapped in the blind slot portions is metered from the indentations to the face of the clutch plate and that the resulting film appears to be stable over a wide range of input speeds and slip conditions.

In another of its aspects, the invention is directed to a method of making pressure plates in accordance with the above principles.

For the purpose of illustrating the invention, there are shown in the drawings forms of the invention which are presently preferred, it being understood, however, that the invention is not limited to the precise arrangements and instrumentalities shown.

Figure 1:
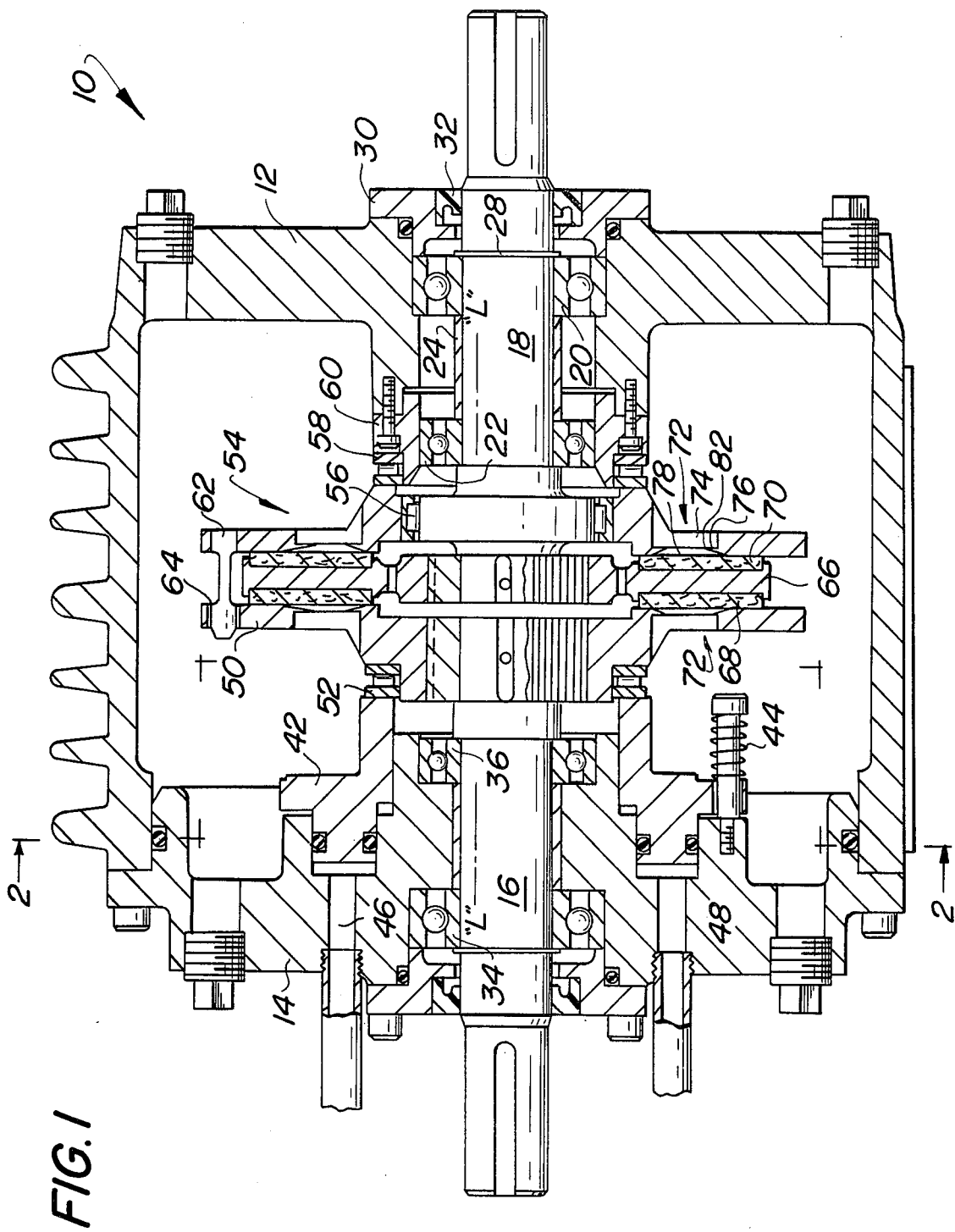
FIG. 1 is a longitudinal cross-sectional view of a torque control device in accordance with the present invention.
Figure 2:
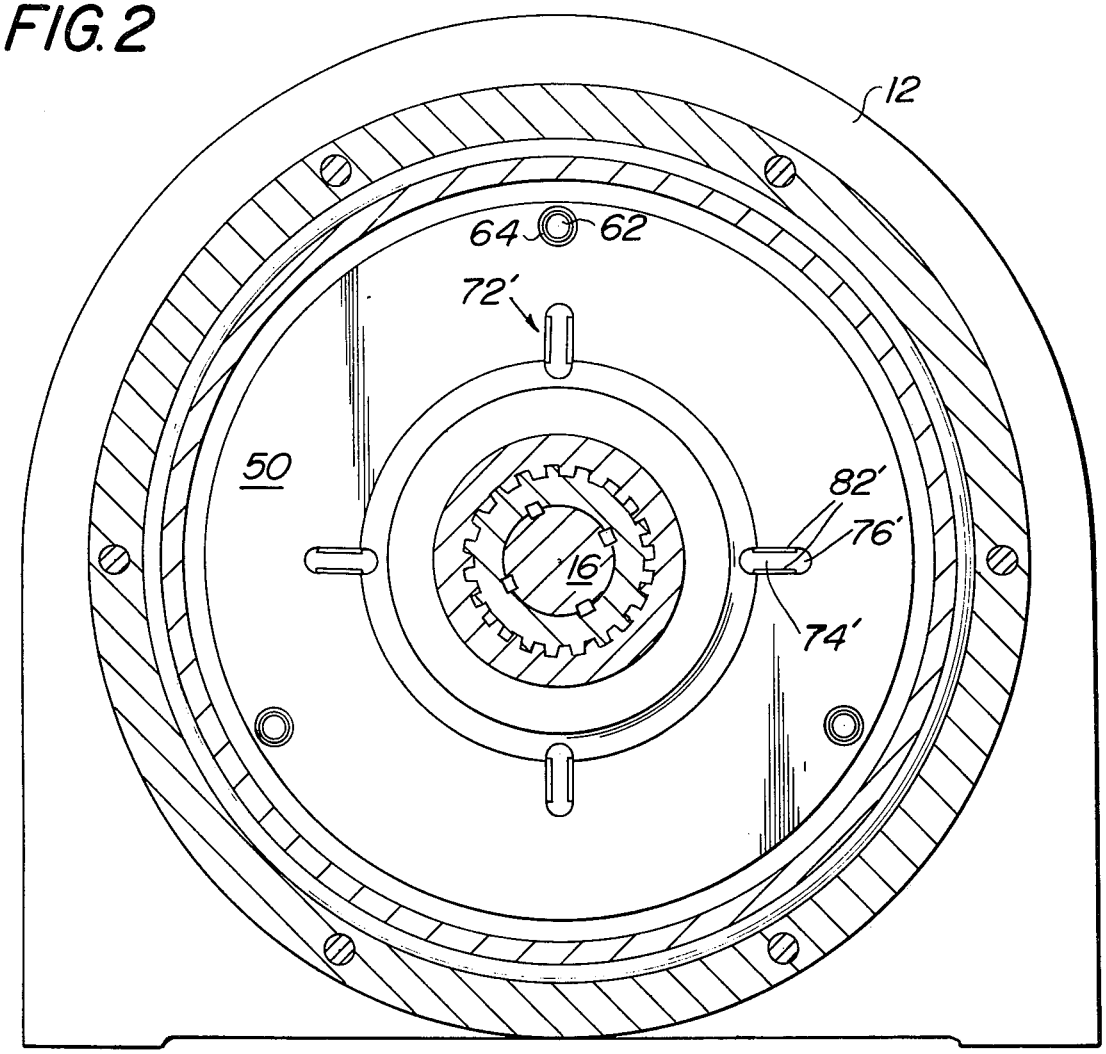
FIG. 2 is a transverse cross-sectional view, taken along the line 2—2 in FIG. 1.

Referring now to the drawings in detail, wherein like reference numerals indicate like elements, there is seen in FIG. 1 a torque control device designated generally by the reference numeral 10. The torque control device 10 includes a housing 12 and housing cover 14, the housing 12 and housing cover 14 providing support for respective input and output shafts 16 and 18. In this regard, the output shaft 18 is supported by shaft bearings 20 and 22, separated by a spacer 24. The bearing 20 is retained by a suitable retaining ring 28 affixed to the output shaft 18, and by a bearing cover 30. The bearing cover 30 is provided with a seal 32, which rides on the periphery of the output shaft 18.

Mounted on the housing cover 14 in the illustrated form of the invention is an annular piston 42, the purpose of which will be described in detail below. The piston 42 is biased, by means of springs 44 or the like, to the left in FIG. 1, that is, toward a retracted position. The piston 42 may be caused to move, through the application of a working fluid such as air or oil, to the right in FIG. 1, for a purpose of which will be described below. The working fluid or the piston 42 enters and may be exhausted through ports 46 and 48.

A main pressure plate, designated generally by the reference numeral 50, is mounted upon the input shaft 16. The pressure plate 50 is constrained, by splines shown or keys, not shown, from rotation relative to the input shaft 16, but is axially slidable with respect to the input shaft 16. A thrust bearing 52 rides on the main pressure plate 50, and abuts the piston 42 to accomodate relative rotation between the main pressure plate 50 and the piston 42, but to permit the transmission of forces directed axially with respect to the input shaft 16 to the main pressure plate 50.

A back pressure plate 54 is mounted in axially fixed relation with respect to the output shaft 18, with bearings 56 interposed between its hub and a portion of the output shaft 18. A thrust bearing 58 rides on a hub 60 coupled to the housing 12, and abuts a radially extending surface of the back pressure plate 54. Circumferentially spaced drive pins 62 extend between and interconnect the main and back pressure plates 50 and 54. In this regard, the main pressure plate 50 is provided with openings 64 into which the drive pins 62 project when the apparatus is assembled.

A clutch plate 66 is mounted on the output shaft 18 for axial, but not rotational, movement with respect to the output shaft 18. The clutch plate 66 includes resilient facings or linings 68 and 70 of natural cork or synthetic cork-like material. In one presently preferred form of the invention, the facings or linings are of the cork-like synthetic material known as "ARMSTRONG #NC733".

For operation of the torque control device 10, the housing 12 is normally filled with a working fluid, such as commercially available motor oil, to about the level designated by the line "L—L" in FIG. 1. Suitable fittings may be provided in the housing 12 for the insertion or removal of the fluid. In general, selection of the working fluid is made on the basis of the expected temperature at which the fluid will operate. For the illustrated form of the invention, it has been found advantageous to use 20 weight oil for applications where oil temperature is under 100° F., and 90 weight gear oil for temperatures 100° F. or greater.

The manner of operation of the torque control device 10 should now be apparent. The application of fluid pressure through the ports 46 and 48 to the piston 52, it will be seen, causes movement of the piston 52 to the right in FIG. 1, and the application of an axially directed force through the thrust bearings 52 to the main pressure plate 50. That force is, in turn, transmitted to the clutch plate 66 and back pressure plate 54, and is ultimately resisted by the thrust bearing 58. The main pressure plate 50 and back pressure plate 54, which are caused to move in unison with the pressure plate 50 by the drive pins 62, rotate in unison with the input shaft 16. The clutch plate 66, on the other hand is constrained to rotate in unison with the output shaft 18 which it is affixed. Although axial force is applied to the main and back pressure plates 50 and 54 in the illustrated form of the invention by the fluid actuated piston 42, it will be recognized that other equivalent actuators may be utilized.

Rotational movement and torque are transmitted between the main and back pressure plates 50 and 54 and the linings 68 and 70 of the clutch plate 66, in the normal condition of operation of the torque control device 10, by shear applied to a thin fluid film maintained at the interfaces of the pressure plates 50 and 54 and the lines 68 and 70. Apparatus for creating and maintaining such a film will now be described in detail.

Figure 3:
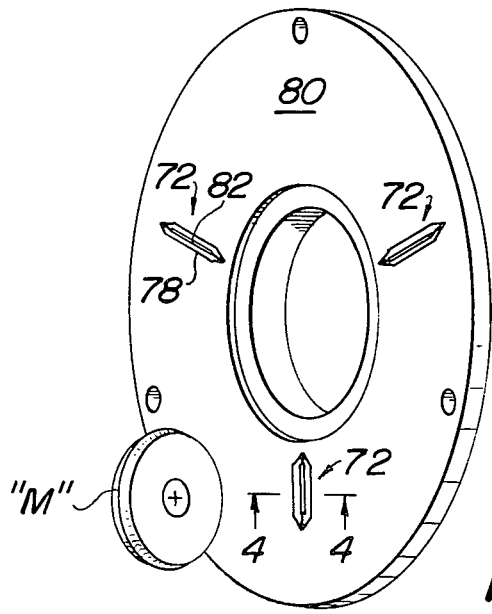
FIG. 3 is a perspective view of a pressure plate in accordance with the invention.
Figure 4:
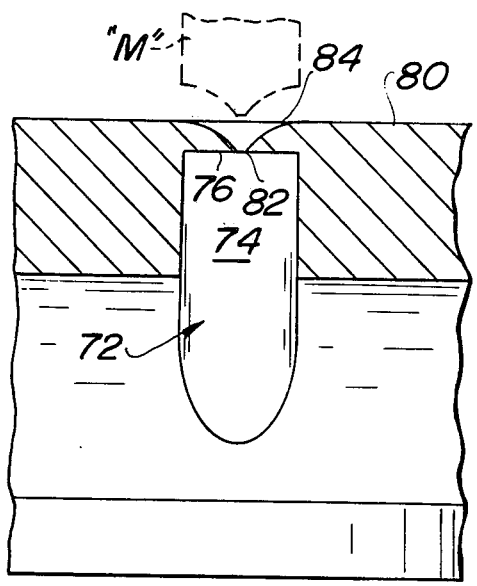
FIG. 4 is a cross-sectional view taken along the line 4—4 in FIG. 3.

With reference to FIGS. 3 and 4, the back pressure plate 54 is seen to be provided with circumferentially spaced fluid transfer ports designated generally by the reference numeral 72. The fluid transfer ports 72 are of a novel configuration which, it has been found, serves to provide across at least substantially the entire face of the somewhat resilient lining 70 of the clutch plate 66 a uniform, stable thin fluid film, capable of transmitting torque by shear. The fluid transfer port 72, the configuration and manner of making of which constitute significant aspects of this invention, comprise, with reference to FIGS. 1 and 4, circumferentially spaced radially extending slots 74. The slots 74 are "blind" in the sense that they do not extend through the entire thickness of the back pressure plate 54, but rather, have a partly closed end wall 76. Also, the slots 74 are closed ended, in the sense that they intersect neither the outer periphery of the back pressure plate 54 nor its internal diameter. An indentation 78 extends from the torque transmitting face 80 of the back pressure plate 54, and intersects the blind slot 74 at a narrow radially extending slot or opening 82. The width of the opening 82 is substantially less than that of the blind slot. For example, in one operative embodiment of the invention, the blind slot 74 had a nominal width of 3/16ths inches, and the slot or opening 82 a width of 0.015 inches. The length of the slot or opening 82 is also less than the length of the blind slot 74. In the above-mentioned embodiment, for example, the blind slot 74 had nominal length of 11/16th inches and the slot or opening 82 a nominal length of 7/16th inches.

The indentation 78 is faired in cross-section to provide bevelled edges 84 (circular arcs in the illustrated embodiment) extending from the slot or opening 82 to the torque transmitting face 80 of the back pressure plate 54. As is seen in FIG. 3, the inner and outer ends of the indentation 78 have a tapered end configuration, and are somewhat boat-shaped in plan view.

Figure 5:
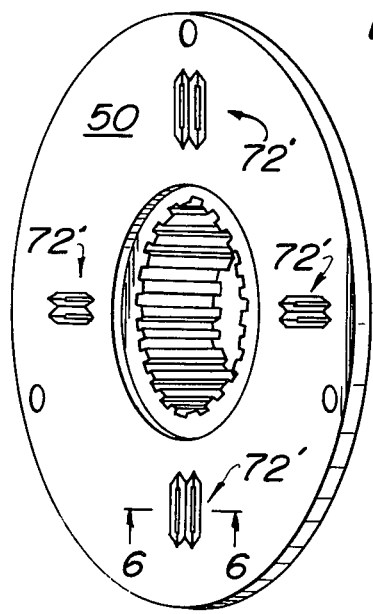
FIG. 5 is a perspective view of another pressure plate in accordance with the invention.
Figure 6:
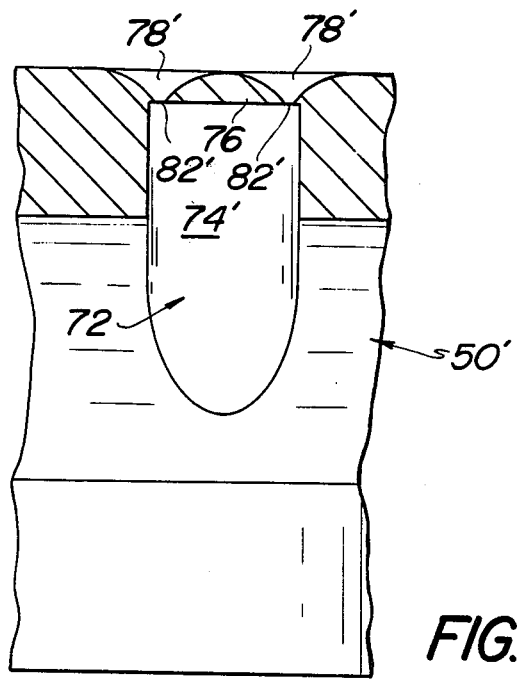
FIG. 6 is a cross-sectional view taken along the line 6—6 in FIG. 5.

In FIGS. 5 and 6, with reference to a main pressure plate such as the main pressure plate 50, there is seen an alternative form of the above described fluid transfer ports 72, in which elements corresponding to those previously described are designated by like primed reference numerals. The main pressure plate 50' is provided with four circumferentially spaced fluid transfer ports 72'. The fluid transfer ports 72' comprise blind slots 74', intersecting with a pair of spaced parallel indentations 78' in the torque transmitting face 80' of the main pressure plate 50'. The indentations 78' intersect the blind slot 74' to define two parallel slots or openings 82' disposed adjacent the spaced side walls of the blind slot 74'. In the illustrated example of a fluid transfer port 72', the nominal width of the blind slot was ¼ inches, and its length 11/16th inches. The width of the slot or openings 82', like that of the above-mentioned example 82, was 0.015 inches. The depth of the indentations 78' from the torque transmitting face 80' of the pressure plate to the intersection with the blind slot 74' was 0.045 inches. The number of transfer ports 72, 72' to be used in a given device is determined in part by the size of the clutch and pressure plates. In some smaller units, two diametrically spaced ports have been found adequate. Others use three or four ports. In general, the same number of ports will be used for the main and back pressure plates in a given device.

The above-described fluid transfer ports 72, 72' can be made by relatively simple manufacturing processes, and the method of their manufacture is an aspect of this invention. In this regard, the blind spots 74 may first be vertically milled at each of the desired circumferentially spaced positions. Next, a rotary mill, the profile of which corresponds to the desired cross-sectional shape of the indentations 78, 78' (as the case may be), may be applied to the torque transmitting face 80, 80' to produce the indentation 78, 78'. Use of this technique yields, in a single operation (1) the indentation 78, 78' of the desired cross-section, (2) the preferred tapered and configuration of the indentation 78, 78', and (3) the slot or opening 82, 82'. There is seen in FIGS. 3 and 4, in front elevation and in phantom, a cutter "M" positioned above the indentation 78 as it would be before or after cutting of the indentation 78.

Figure 7:
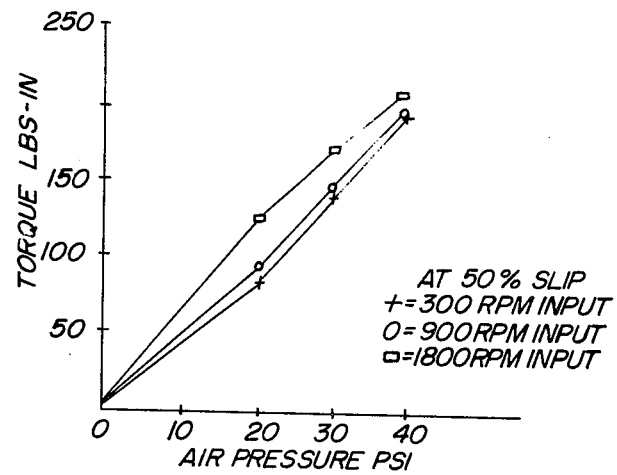
FIG. 7 is a plot of the torque transmitted by an example of a device in accordance with the invention as a function of actuator pressure, an indirect measure of the force applied to the pressure and clutch plates of the device, at three widely divergent input and output speeds representing a 50% condition of slip.

The mechanism by which the fluid transfer ports 72, 72' meter out fluid to produce a stable film is not precisely understood. It is assumed, however, that the blind slots 74, 74', when passing through a reservoir of fluid within the housing 12 pick up quantities of fluid, and that the action of the resilient linings 68 and 70 passing over the bevelled edges 84, 84' of the indentations 78, 78' creates a negative pressure differential (i.e., suction) across the slots or openings 82, 82'. Such a suction would cause a flow of fluid from the blind slots 74, 74' through the slots or openings 82, 82' into the clearance between the torque transmitting face 80 and the linings 68 and 70 of the clutch plate 66. The metering action is such that it appears to occur throughout a wide range of input and slip speeds. For example, with reference to FIG. 7, in one device in accordance with the invention having pressure plates 6½ inches in diameter, input shaft speeds ranging from 300 r.p.m. to 1800 r.p.m. and slip (i.e., the difference in r.p.m. between input and output shafts) of 50 percent at each speed (i.e. 150 to 900 r.p.m. slip), the torque observed at 300 and 900 r.p.m. differed by a maximum of only about 10 percent for a range of air pressure on the piston 42 from 0 to 40 p.s.i. In the same example, the torque observed at 1800 r.p.m. differed from that for 900 r.p.m. by no more than 25 percent throughout the range. For a given input of 1800 r.p.m. and slips of 20 percent, 50 percent and 80 percent in the same device, the plots of torque vs. air pressure differed by about 20 percent or less at each piston pressure, and at inputs of 300 and 900 r.p.m. the plots were as close or closer throughout the range of piston pressure. Such data suggests that throughout slip conditions within the above-stated ranges, the torque-transmitting film remains stable. The lining material for the linings 68 and 70 has a slightly rough surface texture, in addition to resilience, which apparently aids in the formation and maintenance of a stable film. The use of resilient linings in torque control devices of the viscous shear type is not, per se, novel. See for example, the device disclosed in U.S. Pat. No. 3,022,876, issued Feb. 27, 1962, to S. Frankel.

It is clear in any event, that formation of the fluid film in the present apparatus in not significantly impaired by centrifugal effects, presumably because of the entrapment of fluid within the closed-ended blind slots 74, 74'. The forces tending to withdraw fluid through the slots or openings 82' are apparently of sufficient magnitude within a wide range of slip conditions to overshadow centrifugal effects which are a function of rotational speed of the pressure plates 50, 54 and clutch plate 66.

The present torque control device 10 requires no separate pressure inducing apparatus, such as the pump of U.S. Pat. No. 2,576,156, and the flim produced in accordance with the principles of the present invention is stable, and does not decay as do the transient films described in U.S. Pat. Nos. 2,150,950, 3,071,225 and 3,534,842.

The present invention may be embodied in other specific forms without departing from its spirit or essential attributes. Accordingly, reference should be made to the appended claims, rather than to the foregoing specification, as indicating the scope of the invention.

I claim:

1. A torque control device comprising a housing, input and output members journalled in to said housing, spaced pressure plates coupled to one of said members for rotation therewith, a clutch plate interposed between said pressure plates and coupled to the other of said members, and means for applying axially directed force to said pressure plates and said clutch plate, said pressure plates comprising annular disks having a torque-transmitting face thereon and a plurality of circumferentially spaced fluid transfer ports extending therethrough, said ports comprising a blind slot portion opening upon the other face of said disk and extending toward said torque transmitting face, and an indentation in said torque transmitting face extending from said torque transmitting face and intersecting said blind slot, said indentation being elongated in a direction parallel to the major axis of said blind slot portion so that the intersection of said blind spot and said intersection defines an opening having a width and length less than the width and length of said blind slot portion, said indentation providing a bevel between said torque transmitting face and said opening, and resilient lining means on said clutch plate juxtaposed to said fluid transfer ports.

2. Apparatus in accordance with claim 1, wherein said blind slot portions comprise side wall portions extending parallel to a radius of said disk and semi-circular end wall portions interconnecting said side wall portions.

3. Apparatus in accordance with claim 2, wherein said fluid transfer ports include a pair of spaced parallel indentations, the intersections of said indentations defining a pair of said slots.

4. Apparatus in accordance with claim 2, wherein each fluid transfer port includes a single indentation in axial alignment with the major axis of the blind slot portion with which it intersects.

5. Apparatus in accordance with claim 4, wherein said pressure plates comprise a main pressure plate and a back pressure plate, said main pressure plate and said back plate having three fluid transfer ports, respectively, the transfer ports of each plate being spaced from each other by equal arcs and equidistant from the central axis of said disk.

6. Apparatus in accordance with claim 1, wherein the length of said indentations is less than the width of said linings, in a radial direction.

7. A pressure plate for a torque control device of the viscous shear type, comprising an annular disk having a torque-transmitting face thereon, and a plurality of circumferentially spaced fluid transfer ports extending through said disk from said torque-transmitting face to the other face of said disk, said ports comprising a blind slot portion opening upon the other face of said disk and extending toward said torque transmitting face, said blind slot portion having closed ends, and an indentation in said torque transmitting face extending from said torque transmitting face and intersectng said blind slot portion, said indentation being elongated in a direction parallel to the major axis of said blind slot portion so that the intersection of said blind slot and said indentation defines a slot having a width and a length less than the width and length of said blind slot portion, said indentation providing a bevelled edge between said torque transmitting face and said opening.

8. Apparatus in accordance with claim 7, wherein said blind slot portions comprise side wall portions extending generally radially outwardly with respect to said disk and having end wall portions interconnecting said side wall portions, the contours of said indentation in transverse cross-section being defined by segments of circular arcs.

9. Apparatus in accordance with claim 8, wherein each fluid transfer port includes a single indentation in axial alignment with the major axis of the blind slot portion with which it intersects.

10. Apparatus in accordance with claim 9, wherein said pressure plate has three fluid transfer ports, spaced from each other by equal arcs and equidistant from the control axis of said disk.

11. A pressure plate for a torque control device of the viscous shear type, comprising an annular disk having a torque-transmitting face thereon, and a plurality of circumferentially spaced fluid transfer ports extending through said disk from said torque-transmitting face to the other face of said disk, said ports comprising a blind slot portion opening upon the other face of said disk and extending toward said torque transmitting face, and a pair of spaced parallel indentations in said torque transmitting face extending from said torque transmitting face and intersecting said blind slot portion, said indentations being elongated in a direction parallel to the major axis of said blind slot portion so that the intersection of said blind slot portion and said indentations defines openings having a width and length less than the width and length of said blind slot portion, said indentations providing bevelled edges between said torque transmitting face and said openings, said blind slot portions comprising side wall portions extending generally radially outwardly with respect to said disk and having end wall portions interconnecting said side wall portions, the contours of said indentations in transverse cross-section being defined by segments of circular arcs.

* * * * *

UNITED STATES PATENT OFFICE
CERTIFICATE OF CORRECTION

Patent No. 4,049,100                    Dated September 20, 1977

Inventor(s) William P. Davis

It is certified that error appears in the above-identified patent and that said Letters Patent are hereby corrected as shown below:

Column 1, line 61, "other" should read -- outer --.

Column 6, line 18, "flim" should read -- film --.

Column 7, line 17, "intersectng" should read
          -- intersecting --.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*